(12) United States Patent
Oohira

(10) Patent No.: US 9,557,471 B2
(45) Date of Patent: Jan. 31, 2017

(54) LIQUID CRYSTAL DISPLAY DEVICE

(71) Applicants: Japan Display Inc., Tokyo (JP);
Panasonic Liquid Crystal Display Co., Ltd., Hyogo-Ken (JP)

(72) Inventor: Eiji Oohira, Mobara (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 15/198,997

(22) Filed: Jun. 30, 2016

(65) Prior Publication Data

US 2016/0313485 A1    Oct. 27, 2016

Related U.S. Application Data

(63) Continuation of application No. 14/965,307, filed on Dec. 10, 2015, now Pat. No. 9,411,192, which is a continuation of application No. 14/488,680, filed on Sep. 17, 2014, now Pat. No. 9,239,488, which is a continuation of application No. 14/045,915, filed on
(Continued)

(30) Foreign Application Priority Data

Feb. 18, 2010    (JP) ................. 2010-034110

(51) Int. Cl.
| | | |
|---|---|---|
| G02F 1/1333 | (2006.01) | |
| F21V 8/00 | (2006.01) | |
| G02F 1/1335 | (2006.01) | |
| G02F 1/1368 | (2006.01) | |

(Continued)

(52) U.S. Cl.
CPC .............. *G02B 6/005* (2013.01); *G02B 6/0091* (2013.01); *G02F 1/1368* (2013.01); *G02F 1/13394* (2013.01); *G02F 1/133514* (2013.01); *G02F 1/133528* (2013.01); *G02F 1/134363* (2013.01); *G02F 2001/133302* (2013.01)

(58) Field of Classification Search
CPC .................................................. G02F 1/1333
See application file for complete search history.

(56) References Cited

U.S. PATENT DOCUMENTS 9,140,849 B2 * 9/2015 Choi ...................... G02B 6/009
9,239,488 B2    1/2016 Oohira
(Continued)

FOREIGN PATENT DOCUMENTS

JP    2005-024774 A    1/2005
JP    2007-163556 A    6/2007

*Primary Examiner* — Timothy L Rude
(74) *Attorney, Agent, or Firm* — Typha IP LLC

(57) ABSTRACT

A liquid crystal display device includes a LCD panel having a first polarizer, a first substrate, a second substrate and a second polarizer are sequentially provided from a front surface side, a frame which surrounds the LCD panel and has a first opening having first to fourth sides, a planar light source disposed on the rear surface side of the LCD panel in the first opening, a plurality of optical sheet groups which are disposed between the planar light source and the LCD panel, and an adhesive layer which has a second opening formed along the first to fourth sides of the frame. A front surface side of the adhesive layer is adhered to the LCD panel along at least the first side, and a rear surface side of the adhesive layer is adhered to the plurality of optical sheet groups and the frame along at least the first side.

12 Claims, 8 Drawing Sheets

Related U.S. Application Data

Oct. 4, 2013, now Pat. No. 8,866,994, which is a continuation of application No. 13/029,305, filed on Feb. 17, 2011, now Pat. No. 8,558,968.

(51) Int. Cl.
*G02F 1/1343* (2006.01)
*G02F 1/1339* (2006.01)

(56) References Cited

U.S. PATENT DOCUMENTS

| | | |
|---|---|---|
| 2007/0132909 A1 | 6/2007 | Oohira |
| 2008/0055511 A1 | 3/2008 | Park et al. |
| 2008/0165316 A1 | 7/2008 | Hasegawa et al. |
| 2008/0174717 A1 | 7/2008 | Ogawa |
| 2009/0051851 A1 | 2/2009 | Horiuchi et al. |
| 2009/0290095 A1 | 11/2009 | Ogawa |
| 2013/0229596 A1* | 9/2013 | Hosoki .................. F21V 21/00 349/65 |
| 2015/0029443 A1 | 1/2015 | Inui et al. |
| 2015/0253615 A1 | 9/2015 | Ryu et al. |

* cited by examiner

FIG.1
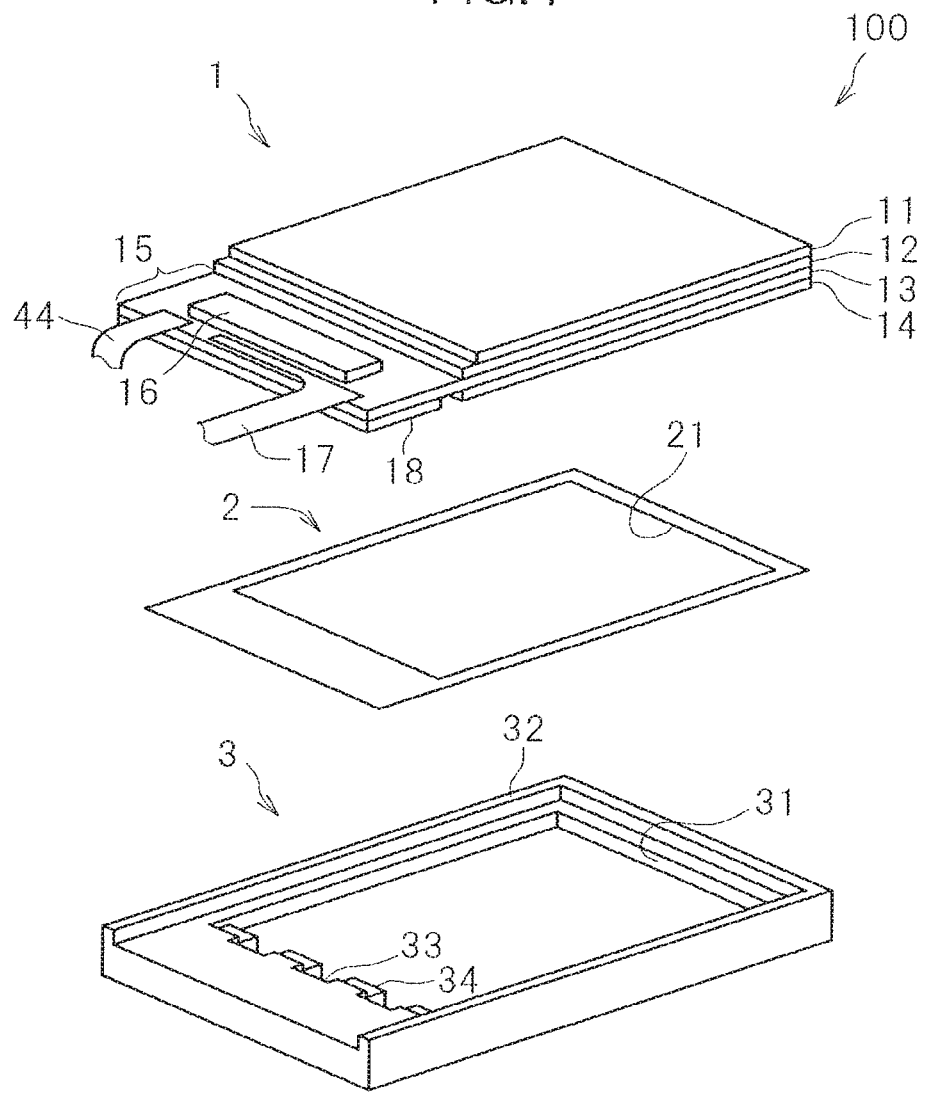
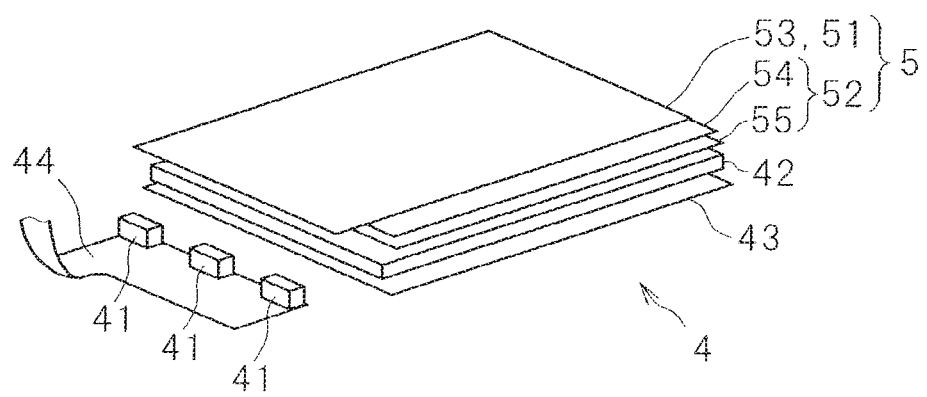

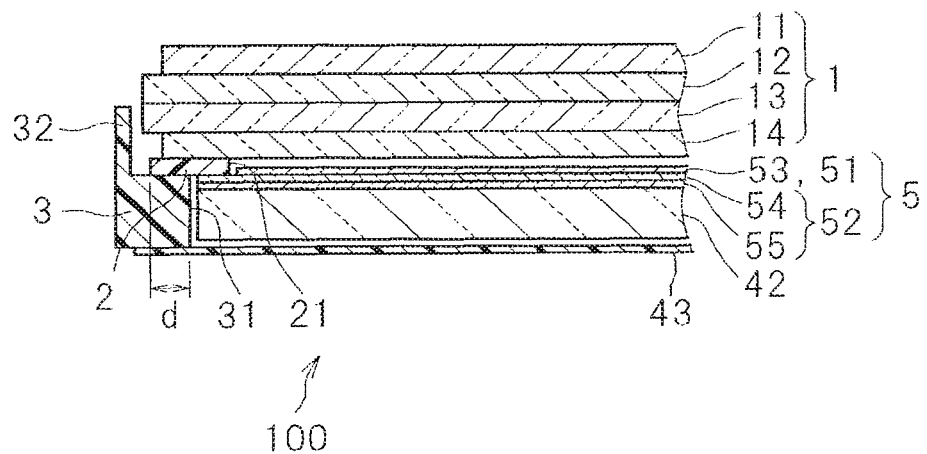
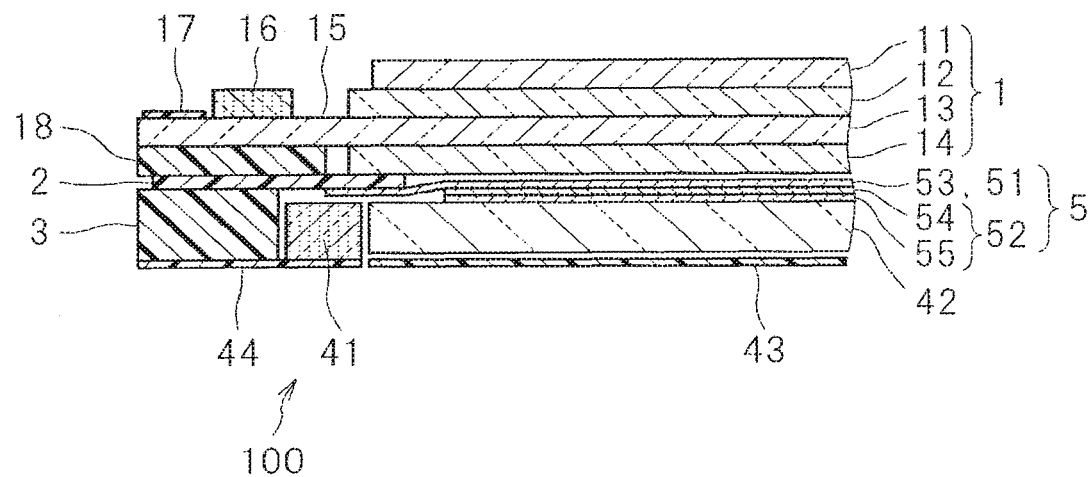
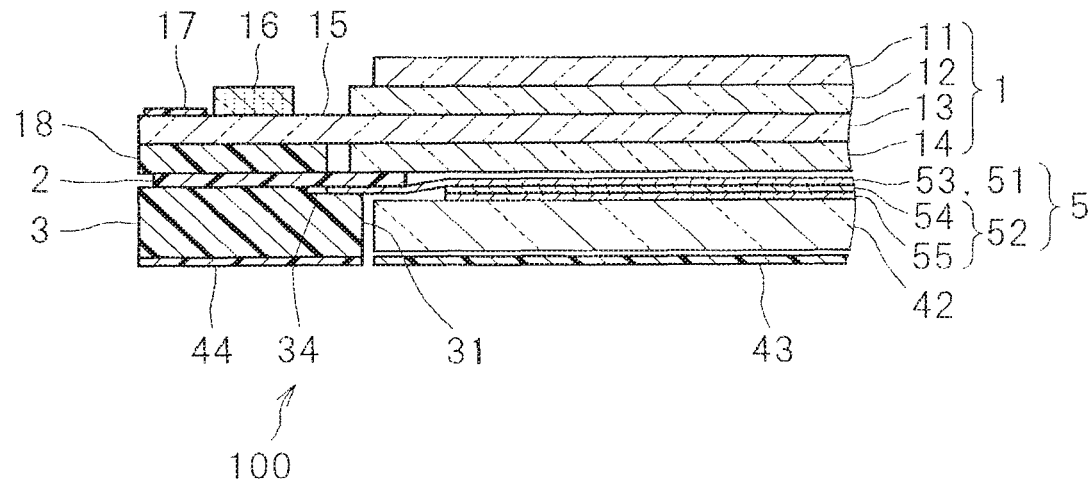

FIG.6
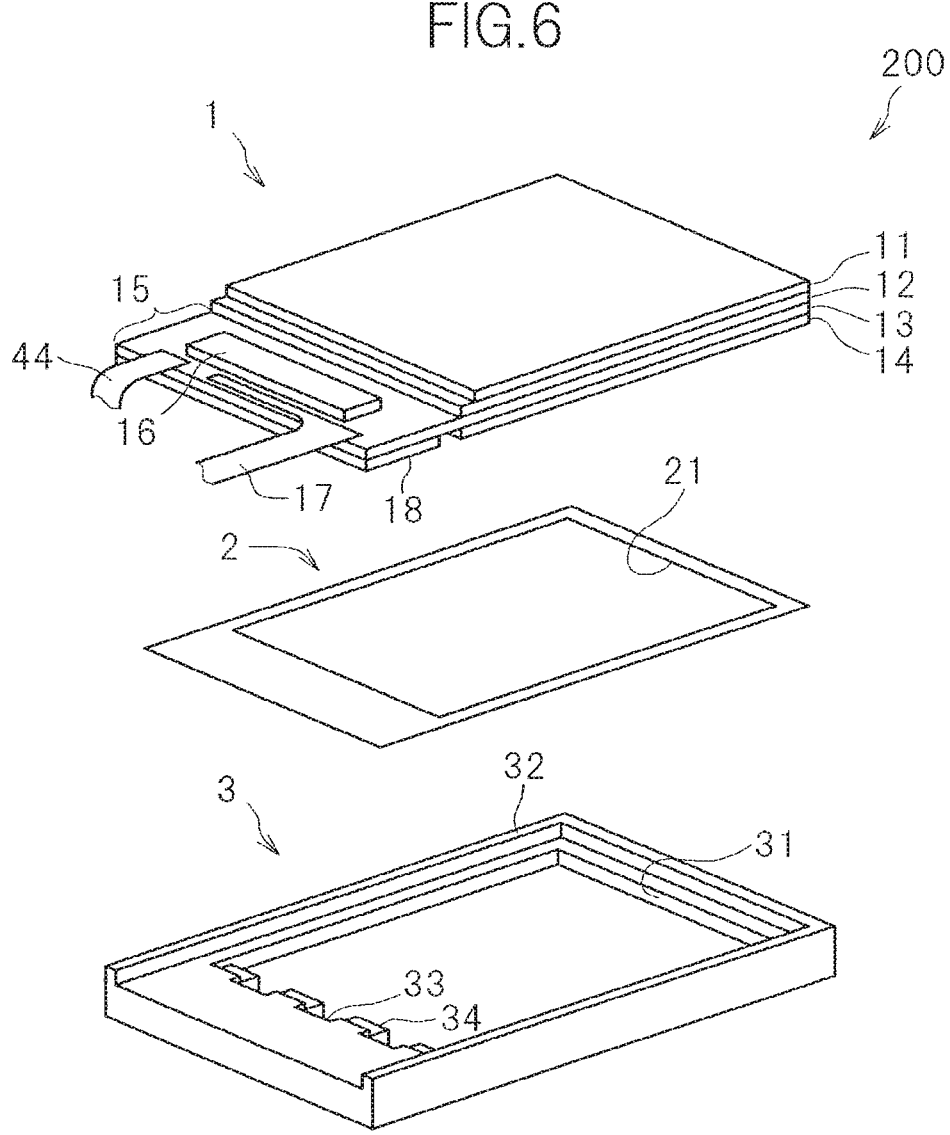
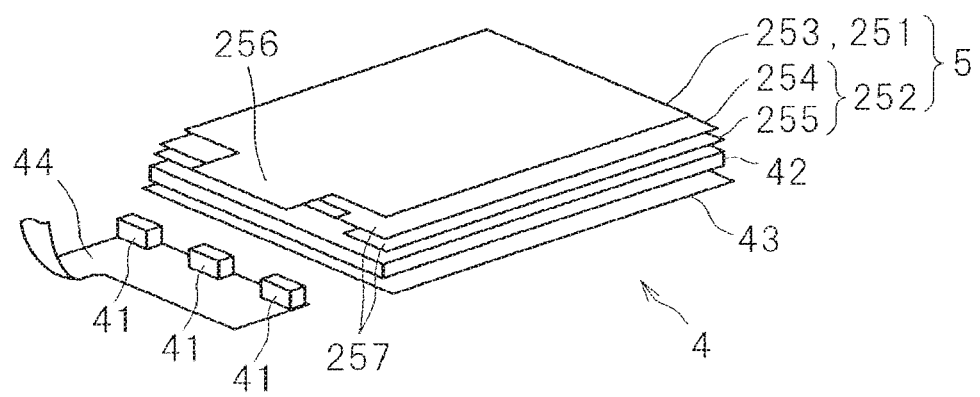

FIG.10
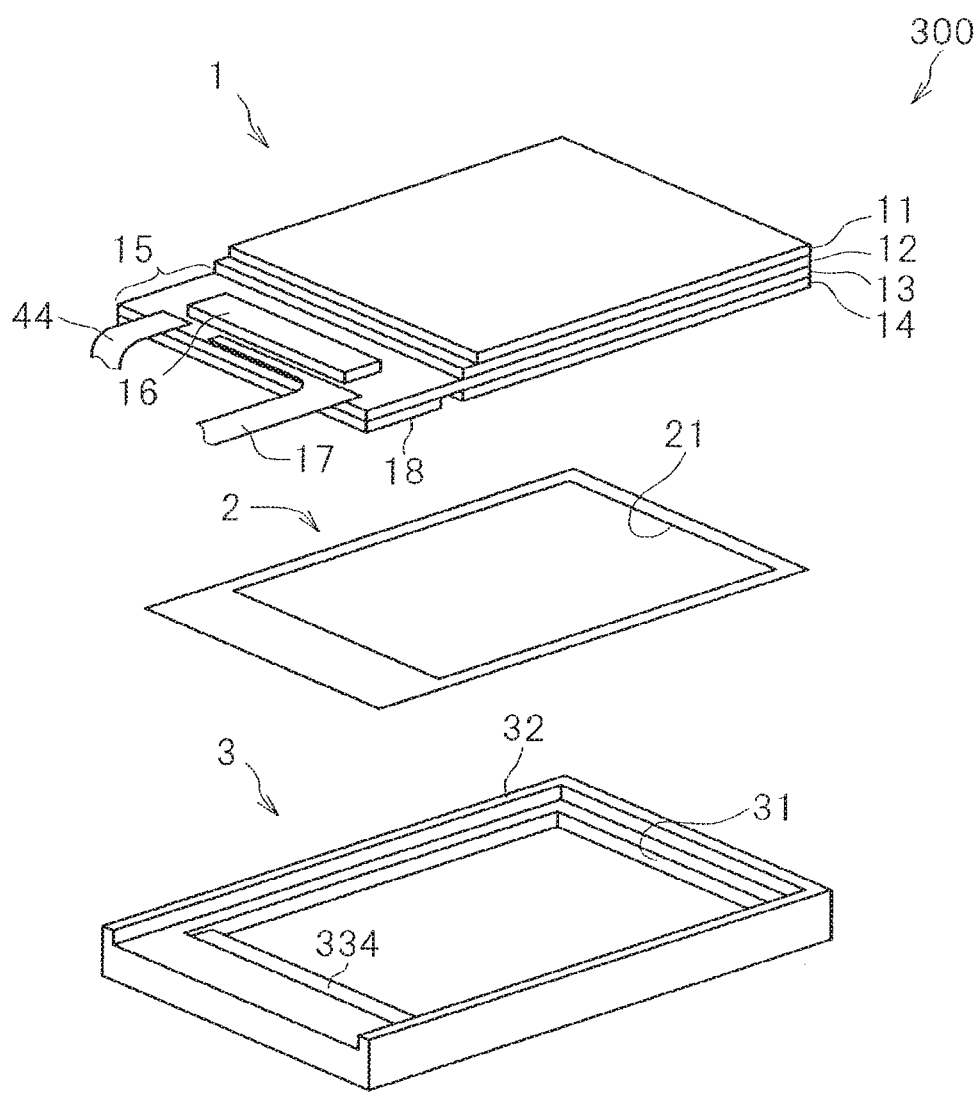
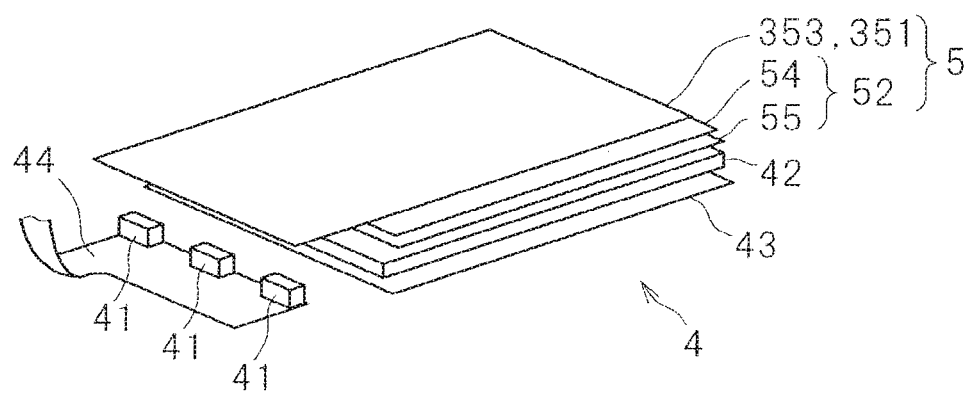

LIQUID CRYSTAL DISPLAY DEVICE

CROSS-REFERENCE TO RELATED APPLICATION

The present application is a continuation of U.S. application Ser. No. 14/965,307, filed Dec. 10, 2015, which is a continuation of U.S. application Ser. No. 14/488,680 (now U.S. Pat. No. 9,239,488), filed Sep. 17, 2014, which is a continuation of U.S. application Ser. No. 14/045,915, now U.S. Pat. No. 8,866,994, filed Oct. 4, 2013, which is a continuation of U.S. application Ser. No. 13/029,305, filed Feb. 17, 2011, now U.S. Pat. No. 8,558,968, the contents of which are incorporated herein by reference.

The present application claims priority form Japanese application JP 2010-034110 filed on Feb. 18, 2010, the content of which is hereby incorporated by reference into this application.

BACKGROUND OF THE INVENTION

1. Field of the Invention

The present invention relates to a liquid crystal display device.

2. Description of the Related Art

There has been an increasing demand for a decrease in thickness of a small and medium-sized liquid crystal display device used in a portable device, etc. in order to reduce the volume or weight thereof. Here, the small and medium-sized liquid crystal display device has a typical structure in which two polarizers and two glass substrates constituting an optical switching member, and a light guiding plate constituting a planar light source, and plural optical sheets disposed therebetween are stacked, and the stacked structure is fixed to a frame by an adhesive sheet.

JP 2007-163556 A discloses a structure that decreases the thickness of the liquid crystal display device, where an external shape of a polarizer at the rear surface side is set to be smaller than an opening inside an adhesive sheet so that the polarizer is accommodated therein, and a frame and a glass substrate (generally, called a TFT substrate) at the rear surface side are directly fixed to each other by the adhesive sheet.

In the small and medium-sized liquid crystal display device, not only a decrease in thickness described above, but also a decrease in frame area, that is, a decrease in width between an end portion of an area displaying an image and an end portion of the liquid crystal display device have been demanded.

In the liquid crystal display device disclosed in JP 2007-163556 A, the width of the adhesive sheet used to fix the frame and the rear surface side glass substrate to each other needs to be narrowed in order to reduce the frame area. However, there is a limit in processing in order to form the adhesive sheet to have a narrow width, and to accurately adhere the adhesive sheet to a corresponding member.

SUMMARY OF THE INVENTION

The invention is made in view of such circumstances, and provides a liquid crystal display device that is thin as a whole and has a narrow frame area.

Of aspects of the present invention disclosed by this application, a brief outline of representative aspects is described as follows.

(1) A liquid crystal display device includes: a substantially rectangular optical switching member in which a first polarizer, a first substrate, a second substrate, and a second polarizer are sequentially provided from a front surface side; a frame which surrounds the optical switching member; a planar light source which is disposed on the rear surface side of the optical switching member; at least one optical sheet group which is disposed at the front surface of the planar light source; and an adhesive layer which fixes the optical switching member, the frame, and the planar light source to each other, and has a substantially rectangular opening, wherein at least one side of an optical sheet included in the optical sheet group and located at the frontmost surface is adhered to the adhesive layer, and the other sides are located inside the opening of the adhesive layer.

(2) In the liquid crystal display device of (1), the optical sheet group includes at least one first optical sheet group having an optical sheet located at the frontmost surface and at least one second optical sheet group having an optical sheet located at the rearmost surface; and the other side of the optical sheet included in the second optical sheet group and located at the frontmost surface is adhered to the adhesive layer.

(3) In the liquid crystal display device of (2), the first optical sheet group includes a first tongue-shaped portion that protrudes from a part of the one side thereof; and the first tongue-shaped portion of the optical sheet included in the first optical sheet group and located at the frontmost surface is adhered to the adhesive layer.

(4) In the liquid crystal display device of (3), the second optical sheet group includes a second tongue-shaped portion that protrudes from a portion except for the first tongue-shaped portion of the one side; and the second tongue-shaped portion of the optical sheet included in the second optical sheet group and located at the frontmost surface is adhered to the adhesive layer.

(5) In the liquid crystal display device of any of (1) to (4), the frame has a step structure on the inside of the one side, and the optical sheet located at the frontmost surface is interposed between the adhesive layer and the step structure.

According to the invention disclosed in the application, the liquid crystal display device may be provided that is thin as a whole and has a narrow frame area.

BRIEF DESCRIPTION OF THE DRAWINGS

FIG. 1 is an exploded perspective view illustrating a liquid crystal display device according to a first embodiment.

FIG. 3 is a cross-sectional view taken along the line A-A of FIG. 2.

FIG. 4 is a cross-sectional view taken along the line B-B of FIG. 2.

FIG. 5 is a cross-sectional view taken along the line C-C of FIG. 2.

FIG. 6 is an exploded perspective view illustrating a liquid crystal display device according to a second embodiment.

FIG. 10 is an exploded perspective view illustrating a liquid crystal display device according to a third embodiment.

DETAILED DESCRIPTION OF THE INVENTION

Figure 2:
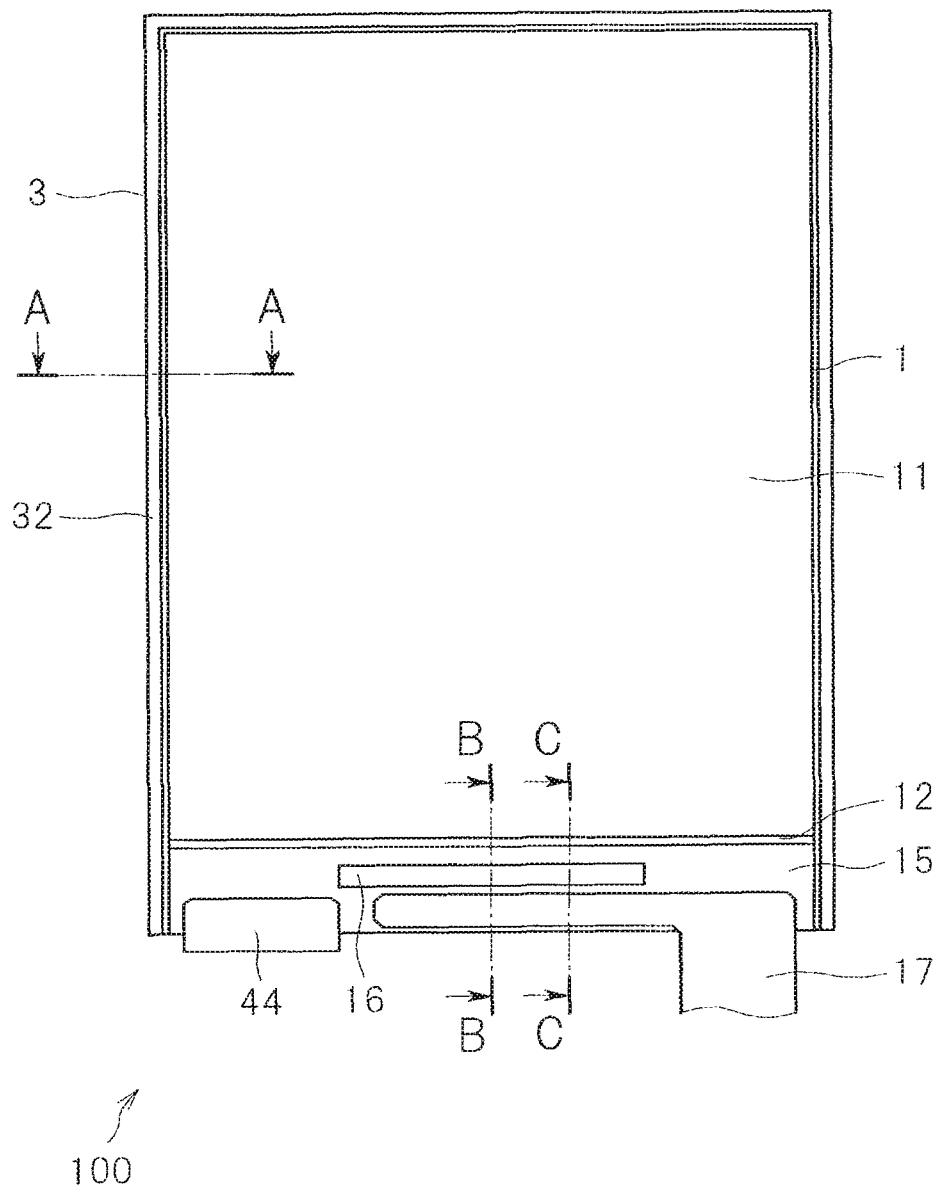
FIG. 2 is a plan view illustrating the liquid crystal display device according to the first embodiment.

Hereinafter, a first embodiment of the invention will be described by referring to the drawings.

FIG. 1 is an exploded perspective view illustrating a liquid crystal display device 100 according to the first embodiment of the invention. The liquid crystal display device 100 includes an optical switching member 1, an adhesive sheet 2 which is an adhesive layer, a frame 3, a planar light source 4, and an optical sheet group 5. Further, a user may see an image displayed on the liquid crystal display device 100 from the upside of the same drawing. Hereinafter, the up direction of the same drawing will be referred to as the front surface side, the opposite direction thereof will be referred to as the rear surface side, the surface facing the front surface side will be referred to as the front surface, and the surface facing the opposite side thereof will be referred to as the rear surface.

An optical switching member 1 has a structure in which a first polarizer 11, a first substrate 12, a second substrate 13, and a second polarizer 14 are sequentially laminated in this order from the front surface side, and has a substantially rectangular shape when taken as a whole. The first substrate 12 is generally called a color filter substrate in which red, blue, and green films are provided for each pixel when the liquid crystal display device 100 is able to display full color. The second substrate 13 is generally called a TFT substrate having thereon plural electrodes respectively corresponding to pixels and plural switching elements such as TFTs (Thin Film Transistors) that control a voltage applied to the electrodes. A layer formed of liquid crystal is held between the first substrate 12 and the second substrate 13. When a voltage is applied to the electrodes formed on the second substrate 13, the alignment direction of liquid crystal corresponding to each pixel changes, and a polarization direction of light transmitted through the liquid crystal layer changes in accordance with the change of the alignment direction. The second polarizer 14 and the first polarizer 11 are disposed so that transmissivity of light changes in accordance with the polarization direction of light transmitted through the liquid crystal layer. Accordingly, the optical switching member 1 serves as a member that changes transmissivity of light for each pixel. Further, the materials of the first substrate 12 and the second substrate 13 are not particularly limited as long as they are transparent, but glass is used in the embodiment. A method of driving liquid crystals may be arbitrarily selected from the generally known methods, and in the embodiment, a method called in-plane switching (IPS) that rotates liquid crystals within a plane parallel to the substrate is used. However, other methods, for example, vertical alignment (VA) or twisted nematic (TN) may be used.

Further, one side of the second substrate 13 extends so that an extension portion 15 is formed to be longer than the first substrate 12, and the front surface of the extension portion 15 is provided with a driving circuit 16 that drives the switching elements on the second substrate. Interconnection such as a flexible print circuit (FPC) 17 is connected onto the extension portion 15 so as to connect the liquid crystal display device 100 to an external device. In the embodiment, the driving circuit 16 is described as a chip IC mounted on the extension portion 15, but the driving circuit may be directly formed on the second substrate 13 by a so-called system on glass (SOG).

A spacer 18 is a member that has the substantially same thickness as that of the second polarizer 14, and is attached to the rear surface of the extension portion 15 after mounting the driving circuit 16 on the extension portion. This is because the second polarizer is not disposed at the rear surface of the extension portion 15 in order to prevent the second polarizer 14 from being deformed or spoiled when thermally pressing the driving circuit 16 or the FPC 17. Accordingly, the spacer is used to absorb a step generated due to the absence of the second polarizer.

As shown in the drawing, the adhesive sheet 2 has a rectangular external shape with a rectangular opening 21, and in the optical switching member 1, three sides except for the side of the extension portion 15 is formed to have a narrow width. The adhesive sheet 2 is an adhesive sheet of which both surfaces are formed as adhesive surfaces, and is used to fix the optical switching member 1, the frame 3, and the optical sheet group 5 to each other. Since the adhesive sheet 2 blocks extra light, the adhesive sheet is preferably black, but may be white or other colors.

The frame 3 is a member that holds the optical switching member 1, the planar light source 4, and the optical sheet group 5, and supports them as an integrated module, and is preferably formed by plastic injection. However, the material or the manufacturing method of the frame 3 is not particularly limited.

The external shape of the frame 3 is substantially rectangular, and the frame has a substantially rectangular opening 31 formed therein. Further, in the optical switching member 1, three sides except for the side of the extension portion 15 are provided with ribs 32 along the outside thereof. The ribs 32 are effectively used to improve the rigidity of the frame 3, and to easily help the positioning operation of the optical switching member when the optical switching member is disposed on the frame, but if not necessary, the ribs may not be necessarily provided. The installation position and the length of the rib 32 may be arbitrarily set. The opening 31 accommodates the planar light source 4 and the optical sheet group 5. The inner edge of the opening 31 on the side of the extension portion 15 is provided with a step structure 34 and a concave portion 33 accommodating a light emitting diode (LED) 41 to be described later. The step structure 34 will be described later in detail.

The planar light source 4 includes plural (here, three) LEDs 41, a light guiding plate 42, and a reflection sheet 43. The LEDs 41 are disposed so that the light emitting direction faces the side surface of the adjacent light guiding plate 42. The light guiding plate 42 is formed of a transmissive material, and preferably, transparent plastic, and has an appropriate surface structure such as a groove reflecting light and formed at the rear surface thereof. Light entering from the side surface of the light guiding plate 42 facing the LED 41 is guided into the light guiding plate 42, and is reflected by the surface structure so that the light is substantially uniformly emitted from the front surface of the light guiding plate. The reflection sheet 43 reflects the light emitted from the rear surface of the light guiding plate 42 so that the light returns to the light guiding plate 42. The LEDs 41 are mounted on the FPC 44, and are electrically connected to the extension portion 15 of the optical switching member 1 in the embodiment. However, the FPC 44 may be connected to an external device without being connected to the optical switching member 1. Further, the number of the LEDs 41 is not particularly limited.

The optical sheet group 5 includes plural optical sheets, and is divided into a first optical sheet group 51 and a second optical sheet group 52. Further, in the specification, the term of "the optical sheet group" is used as a term generally representing one or more optical sheets. Therefore, plural optical sheets may not be included in "the optical sheet group", and only single optical sheet may be included therein.

In the embodiment, the first optical sheet group 51 includes only a prism sheet 53. The second optical sheet group 52 includes a prism sheet 54 and a diffusion film 55. The first optical sheet group 51 is disposed on the front surface side in relation to the second optical sheet group 52. Further, the shapes of the first optical sheet group 51 and the second optical sheet group 52 are slightly different from each other. Specifically, on the side of the extension portion 15 in the optical switching member 1, the first optical sheet group 51 is longer than the second optical sheet group 52 and extends toward the extension portion 15, and on the side of the other sides of the switching member, the first optical sheet group 51 is slightly smaller than the second optical sheet group 52. The dimensions of the optical sheet groups will be described later in detail.

Further, in the embodiment, the optical sheet group 5 includes three optical sheets, but the invention is not limited thereto. For example, the optical sheet group 5 may include four or more optical sheets by adding a luminance improving film or other optical compensating films, or may include two optical sheets by omitting any one of the prism sheet 53 and the prism sheet 54. In this case, the front surface of the light guiding plate 42 may be provided with an appropriate surface structure that serves as the prism sheet. Alternatively, in some cases, only one optical sheet may be used. In this case, the optical sheet group 5 includes the first optical sheet group 51 only having a single optical sheet, and does not include the second optical sheet group 52.

FIG. 2 is a plan view illustrating the liquid crystal display device 100 according to the embodiment. In the drawing, the above-described members are shown with their reference numerals given thereto.

FIG. 3 is a cross-sectional view taken along the line A-A of FIG. 2. As shown in the same drawing, the second polarizer 14 of the optical switching member 1 is fixed to the front surface of the frame 3 by the adhesive sheet 2. At the same time, the light guiding plate 42 and the optical sheet group 5 are accommodated inside the opening 31 of the frame 3, and in the second optical sheet group 52 disposed at the front surface of the light guiding plate 42, the prism sheet 54 serving as an optical sheet and disposed at the frontmost surface is fixed by the adhesive sheet 2. On the other hand, in the optical sheet group 5, the prism sheet 53 of the first optical sheet group 51 as the optical sheet located at the frontmost surface is formed to have a dimension that the end portion of the prism sheet is disposed on the inside of the second optical sheet group 52, so that the prism sheet is located inside the opening 21 of the adhesive sheet 2. For this reason, the position of the prism sheet 53 in the height direction of the cross-section overlaps with the adhesive sheet 2. Further, in the embodiment, the first optical sheet group 51 includes only the prism sheet 53, but when the first optical sheet group 51 includes plural optical sheets, the dimensions of the optical sheets may be the same. The dimension of the second optical sheet group is substantially the same as that of the light guiding plate 42 in the cross-section, but a slight difference in dimension is allowed. The reflection sheet 43 is fixed to the rear surface of the frame 3.

With the above-described configuration, since the adhesive sheet 2 simultaneously fixes both the frame 3 and the second optical sheet group 52 to the optical switching member 1, the width of the adhesive sheet 2 is wide compared with the case where any one of them is fixed. Therefore, the width of the portion indicated by d in the drawing and fixing the frame 3 and the optical switching member 1 may be narrower than the process limit of the adhesive sheet 2. Further, since the first optical sheet group 51 and the adhesive sheet 2 are disposed at a position where they overlap with each other in the height direction of the cross-section, the respective members constituting the liquid crystal display device 100 are stacked without any waste in space, so that the entire thickness thereof is thin.

Further, as shown in the drawing, the dimension and the precision of each member may be determined so that a gap demanded for processing errors is provided between the inner surface of the opening 31 of the frame 3 and the light guiding plate 42, between the prism sheet 53 as an optical sheet located at the frontmost surface in the first optical sheet group 51 and the second polarizer 14, and between the optical switching member 1 and the rib 32 of the frame 3.

The structure described herein is the cross-section of the left side surface in FIG. 2, but the upper side surface and the right side surface in the same drawing have the same structure.

FIG. 4 is a cross-sectional view taken along the line B-B of FIG. 2. FIG. 4 illustrates the cross-section including the concave portion 33 of the frame 3 shown in FIG. 1. Each LED 41 mounted on the FPC 44 is disposed at each concave portion 33 so that its optical axis faces the right direction in the drawing, and the FPC 44 is fixed to the rear surface of the frame 3. In the cross-section of the optical switching member 1, the second polarizer 14 and the spacer 18 are attached to the adhesive sheet 2 and are fixed onto the frame 3. However, the invention is not limited thereto, and only the spacer 18 may be adhered to the adhesive sheet 2. Further, the driving circuit 16 and FPC 17 are shown on the front surface of the extension portion 15.

The adhesive sheet 2 extends from the front surface of the frame 3 so as to cover the front surface side of the LED 41. Then, the prism sheet 53 as an optical sheet located at the frontmost surface in the first optical sheet group 51 extends to the front surface side of the LED 41, and is adhered to the rear surface of the adhesive sheet 2. At this time, as shown in the drawing, the prism sheet 53 is slightly bent toward the rear surface and is adhered to the rear surface of the adhesive sheet 2. Further, the dimension of the second optical sheet group 52 is set so that its end portion is disposed on the inside of the light guiding plate 42, and hence the prism sheet 53 is not interfered with by other optical sheets. The position of the end portion of the second optical sheet group 52 may be arbitrarily set as long as the end portion is not interfered with by the first optical sheet group 51, and the invention is not limited to the position where the end portion is disposed on the inside of the light guiding plate 42 as in the embodiment.

FIG. 5 is a cross-sectional view taken along the line C-C of FIG. 2. FIG. 5 illustrates the cross-section including the step structure 34 of the frame 3 shown in FIG. 1. The step structure 34 is disposed at the front surface of the opening 31 of the frame 3 facing the light guiding plate 42, and the height of the step is set to be substantially equal to the total thickness of the first optical sheet group 51. In the embodiment, the height of the step is substantially equal to the thickness of the prism sheet 53. In this manner, the first optical sheet group 51 is interposed between the adhesive sheet 2 and the step structure 34, and is firmly fixed thereto as shown in the same drawing. Therefore, the position of the first optical sheet group 51 is difficult to be deviated.

Further, the step structure 34 is not essentially needed when the first optical sheet group 51 and the frame 3 are not interfered with by each other. Further, the height of the step structure 34 may be larger than the total thickness of the first optical sheet group 51.

Subsequently, a second embodiment of the invention will be described by referring to the drawings. FIG. 6 is an exploded perspective view illustrating a liquid crystal display device 200 according to the second embodiment. The embodiment is equal to the first embodiment except that a first optical sheet group 251 and a second optical sheet group 252 have different shapes on the side of the extension portion 15. Therefore, the same reference numerals will be given to the same components as those of the first embodiment, and the description thereof will not be repeated.

As obviously understood from FIG. 6, a prism sheet 253 constituting the first optical sheet group 251 includes a first tongue-shaped portion 256 that protrudes from a part of the side thereof on the side of the extension portion 15. On the other hand, a prism sheet 254 and a diffusion film 255 constituting the second optical sheet group 252 include second tongue-shaped portions 257 that protrude from the portion except for the first tongue-shaped portion 256 on the side of the extension portion 15. In other words, the first tongue-shaped portion 256 and the second tongue-shaped portions 257 are not formed at positions where the tongue-shaped portions overlap with each other in a plan view. Preferably, the first tongue-shaped portion 256 and the second tongue-shaped portions 257 may be respectively formed in complementary shapes, that is, may be formed alternately. Further, at the side of the first optical sheet group 251 on the side of the extension portion 15, the position of the end portion of the portion except for the first tongue-shaped portion 256 is disposed on the inside of the end portions of the second tongue-shaped portions 257 of the second optical sheet group 252. At the side of the second optical sheet group 252 on the side of the extension portion 15, it is preferable that the position of the end portion except for the second tongue-shaped portions 257 is disposed slightly on the inside of the end portion of the light guiding plate 42.

Figure 7:
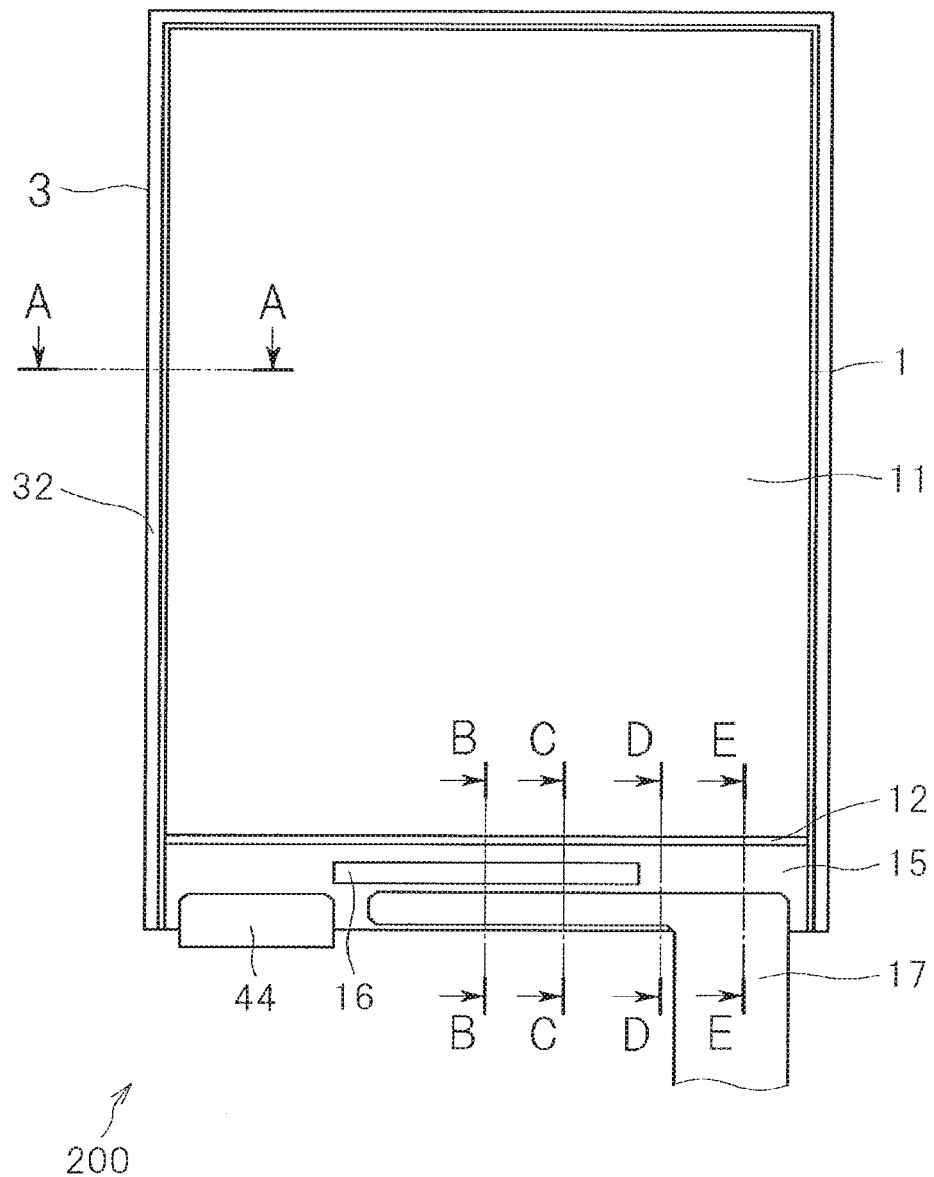
FIG. 7 is a plan view illustrating the liquid crystal display device according to the second embodiment.

FIG. 7 is a plan view illustrating the liquid crystal display device 200 according to the embodiment. The liquid crystal display device 200 has the completely same external shape as that of the liquid crystal display device 100 according to the first embodiment.

The cross-section taken along the line A-A of FIG. 7 is completely the same as the cross-section of the first embodiment shown in FIG. 3, and the cross-sections respectively taken along the lines B-B and C-C and including the first tongue-shaped portion 256 are completely the same as those of the first embodiment shown in FIGS. 4 and 5. Therefore, since the description for the cross-section is the same as that of the first embodiment, the repetitive description is not made herein.

Figure 8:
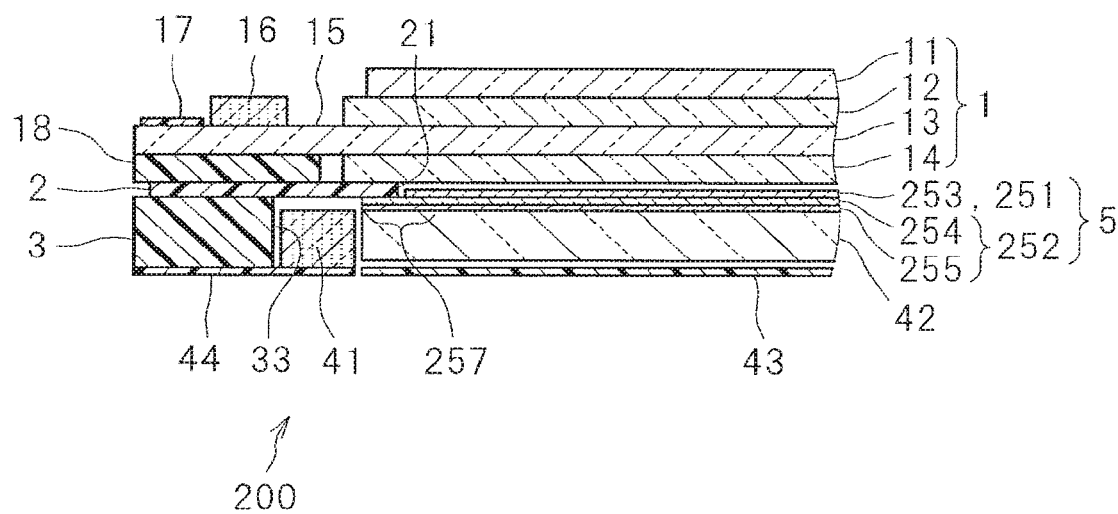
FIG. 8 is a cross-sectional view taken along the line D-D of FIG. 7.

FIG. 8 is a cross-sectional view taken along the line D-D of FIG. 7. FIG. 8 illustrates the cross-section including the second tongue-shaped portions 257 shown in FIG. 6 and the concave portion 33 of the frame 3 shown in FIG. 6. In the second tongue-shaped portions 257, the prism sheet 254 as an optical sheet located at the frontmost surface in the second optical sheet group 252 is adhered to the adhesive sheet 2. The position of the end portion of the first optical sheet group 251 is disposed on the inside of the opening 21 of the adhesive sheet 2.

Figure 9:
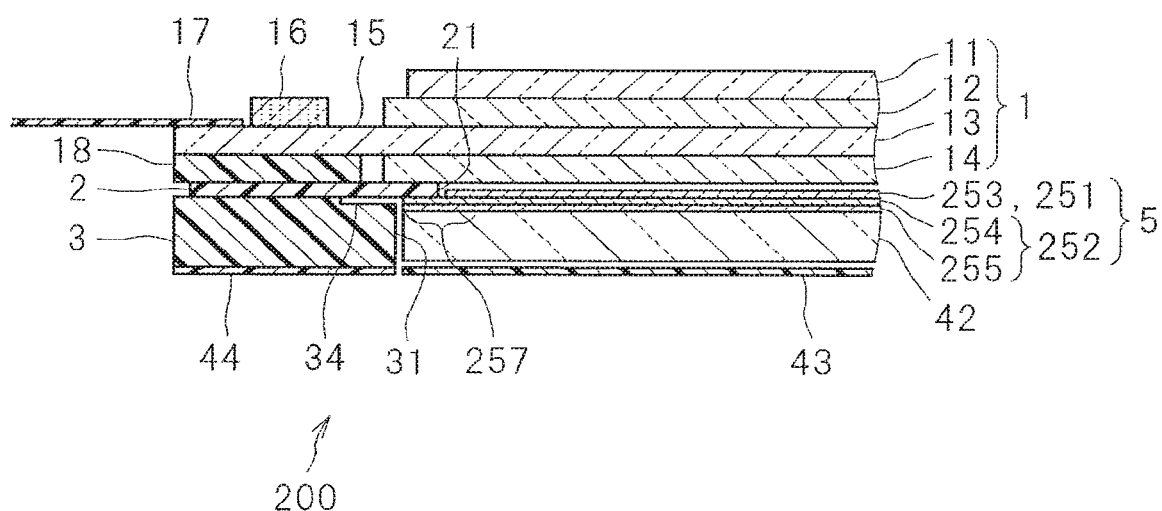
FIG. 9 is a cross-sectional view taken along the line E-E of FIG. 7.

Further, FIG. 9 is a cross-sectional view taken along the line E-E of FIG. 7. FIG. 9 illustrates the cross-section including the second tongue-shaped portions 257 shown in FIG. 6 and the step structure 34 of the frame 3 shown in FIG. 6. Even in the cross-section, in the second tongue-shaped portions 257, the prism sheet 254 as an optical sheet located at the frontmost surface in the second optical sheet group 252 is adhered to the adhesive sheet 2, and the position of the end portion of the first optical sheet group 251 is disposed on the inside of the opening 21 of the adhesive sheet 2.

In this manner, the second optical sheet group 252 is interposed between the adhesive sheet 2 and the light guiding plate 42, and is firmly fixed thereto. Therefore, the position of the second optical sheet group 252 is difficult to be deviated.

In the example of the embodiment, one first tongue-shaped portion 256 is provided at the center of the side of the first optical sheet group 251 on the side of the extension portion 15, but the invention is not limited thereto. The first tongue-shaped portion 256 may be provided at the left or right side, and the number thereof may be plural. The same applies to the second tongue-shaped portions 257.

Further, a third embodiment of the invention will be described by referring to the drawings. FIG. 10 is an exploded perspective view illustrating the liquid crystal display device 300 according to the third embodiment of the invention. The embodiment is equal to the first embodiment except that the concave portion is not formed in the frame 3, and a first optical sheet group 351 is formed in a shape further extending toward the extension portion 15. Therefore, the same reference numerals will be given to the same components as those of the first embodiment, and the description thereof will not be repeated.

Since the plan view of the liquid crystal display device 300 according to the embodiment is the same as that of the first embodiment, the cross-section thereof will be described by referring to FIG. 2.

Figure 11:
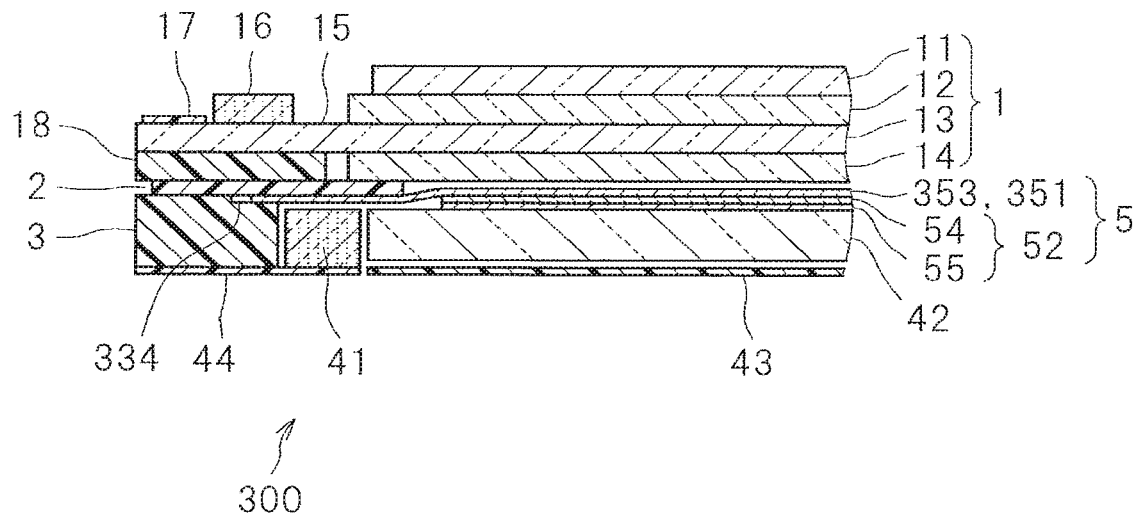
FIG. 11 is a cross-sectional view taken along the line B-B of FIG. 2 of the third embodiment.

FIG. 11 is a cross-sectional view taken along the line B-B of FIG. 2 in the third embodiment. The first optical sheet group 351 crosses the front surface side of the LED 41, and extends to a step structure 334 of the frame 3 in the direction of the extension portion 15. Then, the first optical sheet group is interposed between the adhesive sheet 2 and the step structure 334 and is fixed thereto.

Figure 12:
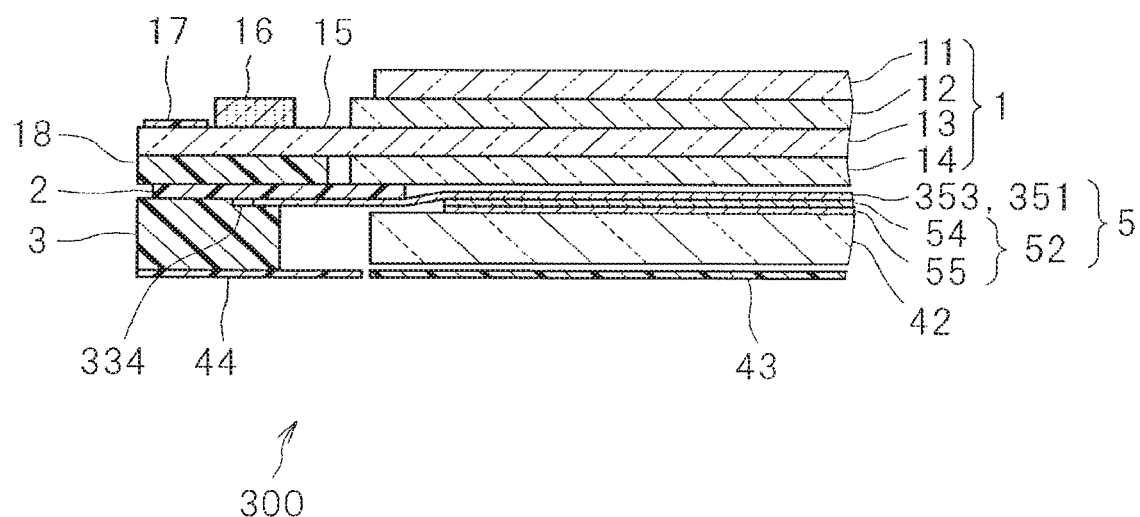
FIG. 12 is a cross-sectional view taken along the line C-C of FIG. 2 of the third embodiment.

FIG. 12 is a cross-sectional view taken along the line C-C of FIG. 2 in the third embodiment. FIG. 12 is equal to FIG. 11 except that the LEDs 41 are not shown in the drawing.

As in the liquid crystal display device 300 according to the embodiment, the frame 3 may not be essentially provided with the concave portion. However, when the concave portion 33 is formed as in the first embodiment, the positioning operation of the LEDs 41 may be easily performed during the assembly. Further, the external shape of the expensive first optical sheet group 51 slightly becomes smaller, and the cost involved with material is reduced.

In the above-described embodiments, a case has been described in which the first optical sheet group includes a single optical sheet, and the second optical sheet group includes two optical sheets, but the number of optical sheets for each optical sheet group may be appropriately determined in consideration of the thickness of the optical sheet to be used and the thickness of the adhesive sheet. For example, when the thickness of each optical sheet to be used is 65 µm, and the thickness of the adhesive sheet is 70 µm, the first optical sheet group may include a single optical sheet. When the thickness of each optical sheet is 50 µm, the first optical sheet group may include a single optical sheet, and the thin adhesive sheet is used such as to be, for example, 55 µm. Alternatively, the first optical sheet group may include two optical sheets so that the total thickness is 100 µm, and the adhesive sheet having 105 µm of thickness may be used. In any case, the number of optical sheets respectively allocated to the first optical sheet group and the second optical sheet group needs to be determined in consideration of an error or a thickness of a material to be used so that the liquid crystal display device is thin as a whole.

Further, in the above-described embodiments, the LEDs are disposed only at one side surface of the light guiding plate, but may be disposed at other side surfaces, for example, two facing side surfaces. In this case, in the optical sheet group, not only one side of the optical sheet located at the frontmost surface, but also two opposite sides thereof may be fixed to the adhesive sheet. In other words, at least one side of the optical sheet located at the frontmost surface may be adhered to the adhesive sheet.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. A liquid crystal display device comprising:
   a liquid crystal display panel for displaying;
   a light guide plate arranged behind the liquid crystal display panel and having a main surface and a side surface;
   a light source including a front side surface opposed to the side surface; and
   an optical sheet disposed between the liquid crystal display panel and the light guide plate,
   wherein a light emitted from the front side surface of the light source inputs into the light guide plate from the side surface and outputs from the main surface,
   wherein the optical sheet extends from the light guide plate to the front side surface of the light source in plan view.

2. The liquid crystal display device according to claim 1, further comprising an adhesive member disposed between the optical sheet and the liquid crystal display panel,
   wherein the adhesive member has a rectangular opening.

3. The liquid crystal display device according to claim 2, wherein
   the optical sheet is adhered to the liquid crystal display panel by the adhesive member.

4. The liquid crystal display device according to claim 1, wherein the light source has a rear side surface, and
   the optical sheet extends beyond the rear side surface.

5. The liquid crystal display device according to claim 1, wherein
   the optical sheet has a first side, a second side, a third side and a fourth side.

6. The liquid crystal display device according to claim 5, wherein
   the first side of the optical sheet is adhered to the liquid crystal panel and the fourth side which is opposed to the first side is not adhered to the liquid crystal display panel.

7. A liquid crystal display device comprising:
   a liquid crystal display panel for displaying;
   a light guide plate arranged behind the liquid crystal display panel and having a main surface and a side surface;
   a light source including a front side surface facing the side surface; and
   a plurality of optical sheets disposed between the liquid crystal display panel and the light guide plate,
   wherein a light emitted from the front side surface of the light source inputs into the light guide plate from the side surface and outputs from the main surface,
   wherein a first optical sheet which is disposed at a top of the plurality of the optical sheets extends from the light guide plate to the front side surface of the light source in plan view.

8. The liquid crystal display device according to claim 7, further comprising an adhesive member disposed between the plurality of optical sheets and the liquid crystal display panel,
   wherein the adhesive member has a rectangular opening.

9. The liquid crystal display device according to claim 8, wherein
   the first optical sheet is adhered to the liquid crystal display panel by the adhesive member.

10. The liquid crystal display device according to claim 7, wherein
    the light source has a rear side surface, and
    the first optical sheet extends beyond the rear side surface.

11. The liquid crystal display device according to claim 7, wherein
    the first optical sheet of the plurality of optical sheets has a first side, a second side, a third side and a fourth side.

12. The liquid crystal display device according to claim 11, wherein
    the first side of the first optical sheet is adhered to the liquid crystal display panel and overlaps the light source.

* * * * *